United States Patent [19]

Kinoshita et al.

[11] Patent Number: 4,467,510
[45] Date of Patent: Aug. 28, 1984

[54] METHOD OF CONDITIONING A ROTARY VALVE SEAT

[75] Inventors: Takao Kinoshita; Kazushige Onaka, both of Hyogo, Japan

[73] Assignee: Nippon Air Brake Co., Ltd., Kobe, Japan

[21] Appl. No.: 337,919

[22] Filed: Jan. 8, 1982

[51] Int. Cl.³ .............................................. B21D 53/00
[52] U.S. Cl. .............................. 29/157.1 R; 75/126 R; 51/281 R
[58] Field of Search ....................... 29/157.1 R, 402.01, 29/402.06, 402.11, 402.07, 156.7 R, 156.7 A; 123/188 S; 75/126 A, 240, 243; 51/290, 281

[56] References Cited

U.S. PATENT DOCUMENTS

| | | | |
|---|---|---|---|
| 2,214,652 | 9/1940 | Bancroft | 75/126 A |
| 2,268,723 | 1/1942 | Scherer | 51/281 R |
| 3,663,214 | 5/1972 | Moore et al. | 75/126 A |
| 3,849,122 | 11/1974 | Gobble et al. | 75/126 A |
| 3,977,867 | 8/1976 | Cochran et al. | 75/126 A |
| 4,119,459 | 10/1978 | Ekemar et al. | 75/243 |
| 4,146,080 | 3/1979 | Baum | 75/240 X |

FOREIGN PATENT DOCUMENTS

| | | | |
|---|---|---|---|
| 923341 | 3/1973 | Canada | 75/126 A |
| 52-47705 | 5/1977 | Japan | 51/290 |

OTHER PUBLICATIONS

*ASM Metals Handbook*, by American Soc. for Metals, 1961 ed., pp. 362–365.

Primary Examiner—Howard N. Goldberg
Assistant Examiner—Carl J. Arbes
Attorney, Agent, or Firm—Gary J. Falce

[57] ABSTRACT

A method of forming concavities in a cast iron valve seat to which lubricating oil may be applied to reduce the abrasion between the valve seat and a handle operated rotary valve that is slidably engagable with the valve seat. Pockets of graphite are formed at the valve seat surface by heat treating the valve seat, following which the valve seat undergoes a lapping process that removes the graphite and leaves numerous concavities in the valve seat surface. These concavities hold the lubrication and thus extend the abrasion-free life of the rotary valve and valve seat interface to enhance the metal-to-metal seal thereat.

3 Claims, 2 Drawing Figures

METHOD OF CONDITIONING A ROTARY VALVE SEAT

BACKGROUND OF THE INVENTION

The present invention relates to rotary valves, such as the brake valve employed in railway air brake systems, and more particularly to a method of forming the rotary valve seat.

Generally, a brake valve is activated when the brake valve handle (the operating handle) is placed in the release position. Compressed air is supplied to the brake pipe from the compressed air reservoir. When the brake valve handle is moved to the brake position, the compressed air in the brake pipe is released into the atmosphere and the brake pipe pressure is reduced by the operation of the brake valve.

The valve seat and the rotary valve in the brake valve are in contact (metal-to-metal) and are structured so that the rotary valve rotates on the valve seat when the brake valve handle is operated. There is considerable slide resistance between the rotary valve and the valve seat. Grease is conventionally used between the rotary valve and the valve seat in order to reduce this resistance.

There is, however, just an oil film between the rotary valve and the valve seat. Due to the frequent use of the brake valve handle, the more the brake handle is used, the more the grease is dissipated. Also, the areas where the rotary valve and the valve seat come into contact wear quickly, causing abrasion. The increase in the slide resistance impedes the operation of the handle, and frequent check-ups are required within a short period of time.

Various solutions have been tried to overcome this problem, including teflon coating of the rotary valve seat and the mechanical formation of numerous concavities in the valve seat surface to which a lubricating oil was applied. In the first instance, the teflon coating peeled off with wear and leakage resulted. In the second instance, the surface finish was damaged by the mechanical forming of the concavities in the surface, depending upon the number and location of the concavities, resulting in air leakage.

SUMMARY OF THE INVENTION

The object of the present invention is to form concavities in the surface of the rotary valve seat in such a way as to avoid damaging the surface finish.

This objective is achieved by taking advantage of the characteristic of gray cast iron by which graphite tends to be separated during heat treatment by the decomposition of pearlite. This graphite (free carbon) is subsequently removed by lapping the surface of the valve seat. Typical compositions of gray cast iron fall within the range of about 2.5% to about 3.5% carbon; about 1.5% to about 3.0% silicon; about 0.5% to about 0.8% manganese; about 0.1 to about 0.2% sulfur; about 0.2% phosphorous, and the balance essentially iron. After the lapping operation, numerous tiny concavities remain in the surface of the valve seat, when the graphite is removed, to which lubricating oil is applied. These concavities in the valve seat thus serve as tiny reservoirs in which the lubricating oil is contained during operation of the rotary valve on the valve seat in order to reduce the frictional resistance to valve movement for an extended duration. By forming these concavities in the manner explained, the surface finish of the valve seat remains undamaged.

BRIEF DESCRIPTION OF THE DRAWINGS

The foregoing objective and other advantages of the invention will become more apparent from the following description when taken with the accompanying drawings in which.

DESCRIPTION AND OPERATION

Figure 1:
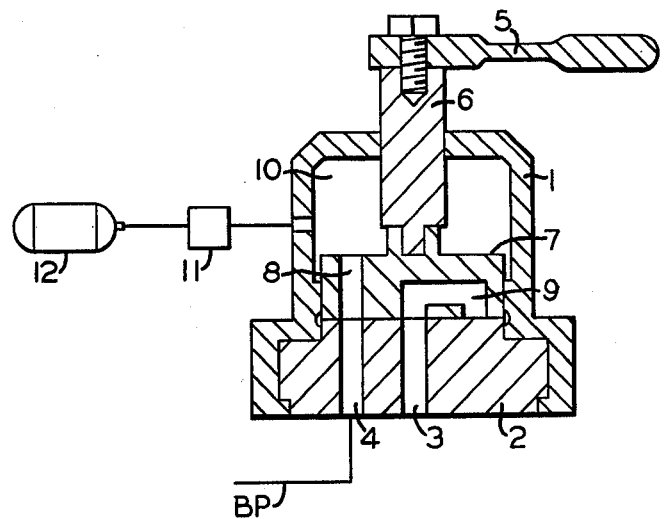
FIG. 1 is a sectional view of a conventional type rotary valve device with which the present invention is applicable.

Referring to FIG. 1, there is shown a brake valve device 1 having a cast iron valve seat 2 with an exhaust passage 3 and a supply/exhaust passage 4. A brake pipe BP is connected to the supply/exhaust passage 4. An operating handle 5 is connected to a shaft 6, which is mounted to rotate freely within the body of brake valve device 1. Connected to the lower end of shaft 6 is a rotary valve 7, which is cooperatively engagable with valve seat 2. Rotary valve 7 is formed with a supply passage 8 and a connecting passage 9. Also formed within the body of valve device 1 is a supply chamber 10 that is connected to a compressed air reservoir 12 via a pressure regulator 11.

In operation, movement of the brake valve handle 5 to a release position, as shown, results in passage 8 in rotary valve 7 being aligned with passage 4 in valve seat 2, so as to connect compressed air from reservoir 12 to the brake pipe. In application position of handle 5, passage 9 in rotary valve 7 interconnects passages 3 and 4 in valve seat 2, and passage 8 is rotated out of alignment with passage 4, thus cutting off the brake pipe connection with reservoir 12, while concurrently exhausting the brake pipe to atmosphere.

From the foregoing, it will be understood that the abutting surfaces between rotary valve 7 and valve seat 2 form a metal-to-metal seal, which is intended to prevent leakage of compressed air at the mating interface of these parts. Reducing friction between these mating parts has long been recognized as a benefit in not only reducing handle forces, but also in reducing abrasion of the mating surfaces, and consequently degradation of the metal-to-metal seal.

In accordance with the present invention, valve seat 2 is initially machined or cast with passages 3 and 4, after which the surface area of the valve seat is heated to approximately 850° C., in a suitable manner, as by a burner. The valve seat is then promptly cooled in quenching oil, and thence reheated to approximately 180° C. in an electric furnace for about one hour. Following this, the valve seat is gradually cooled down to normal temperature. The foregoing heat treatment increases the concentration of graphitic pockets at the surface of the valve seat and also increases the surface hardness.

This hardened surface then undergoes a smoothing process, such as by a conventional machining operation.

In order to form the desired concavities in the hardened valve seat surface, the aforementioned graphite formed in pockets at the surface of the valve seat by the above-explained heat treatment is removed by a lapping process, which tends to pull the graphite free, leaving numerous tiny concavities in the surface of valve seat 2.

Figure 2:
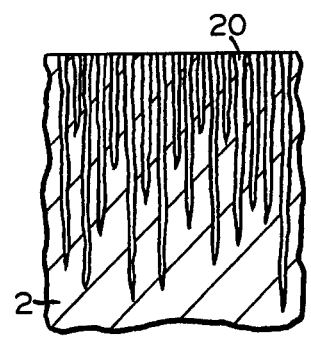
FIG. 2 is an enlarged sectional view of the rotary valve seat showing the numerous concavities formed in accordance with the present invention.

FIG. 2 illustrates these concavities 20 in valve seat 2 under magnification following removal of the graphite. The actual size of a representative concavity 20 is on the order of a few microns in width and 20–30 microns in depth.

Lubricating oil is applied to the surface of valve seat 2 and the rotary valve device 1 is assembled, as shown in FIG. 1. The numerous concavities in the valve seat surface each entrap minute quantities of the lubricating oil, which otherwise would be dissipated, due to the relative sliding action of the rotary valve and seat. In thus extending the duration the lubrication is effective, valve seat wear due to abrasion between the rotary valve and valve seat is minimized over an extended period, during which the integrity of the metal-to-metal seal between these parts is maintained.

In accordance with the present invention, resistance to handle movement has been found to decrease by 1.5 times after 10,000 to 50,000 operations and does not show any change in this characteristic, even after 100,000 operations of the handle.

Having thus described our invention, what we claim as new and desire to secure by Letters Patent, is:

1. The method of conditioning the surface of a cast iron rotary valve seat comprising the steps of:
   (a) forming a cast iron rotary valve seat from a cast iron in which graphite particles will be separated during subsequent heat treatment through the decomposition of pearlite;
   (b) heat treating said rotary valve seat to obtain a hardened surface and increase the concentration of graphite particles on the surface of said rotary valve seat;
   (c) lapping said surface of said valve seat at ambient temperature to remove said graphite particles from said surface and thereby form numerous concavities in said valve seat surface; and
   (d) applying lubricant to said valve seat surface whereby said concavities are filled with said lubricant to provide low friction operation of a rotary valve on said seat for an extended duration.

2. The method as recited in claim 1, further comprising the step of smoothing the surface of said valve seat following said heat treatment.

3. The method as recited in claim 1, wherein said heat treating comprises:
   (a) heating said valve seat surface to approximately 850° C.;
   (b) quenching said valve seat surface;
   (c) reheating said valve seat surface to approximately 180° C.;
   (d) maintaining said valve seat heated at approximately 180° C. for a period of about one hour; and
   (e) gradually cooling said valve seat surface to ambient temperature.

* * * * *